United States Patent [19]

Petrak

[11] 4,287,972
[45] Sep. 8, 1981

[54] AUTOMATIC CLUTCH ASSEMBLY

[76] Inventor: Harry A. Petrak, 2565 Table Mesa Dr., Boulder, Colo. 80303

[21] Appl. No.: 87,025

[22] Filed: Oct. 22, 1979

[51] Int. Cl.$^3$ .................. B60B 27/00; F16D 1/06; F16D 43/20
[52] U.S. Cl. .................. 192/54; 192/67 R; 192/93 A; 403/1
[58] Field of Search .................. 192/31, 35, 36, 49, 192/54, 67 R, 93 A, 93 R; 403/1

[56] References Cited

U.S. PATENT DOCUMENTS

| | | | |
|---|---|---|---|
| 3,217,847 | 11/1965 | Petrak | 192/67 R X |
| 3,442,361 | 5/1969 | Hegar | 192/67 R |
| 3,656,598 | 4/1972 | Goble | 192/67 R X |
| 3,829,147 | 8/1974 | Ryswick | 192/54 X |

FOREIGN PATENT DOCUMENTS 2012379  7/1979  United Kingdom .................. 192/54

Primary Examiner—Rodney H. Bonck
Attorney, Agent, or Firm—John E. Reilly

[57] ABSTRACT

A locking gear in the form of an annular, slotted cam member causes a driving member to move into locking engagement with a member to be driven automatically in response to the application of torque or positive rotation to the driving member. The driving member can be disengaged only by removing torque from the driving member and reversing the direction of rotation of the driven member without relying upon spring force for disengagement. Accordingly, the driving member is not only forcefully cammed into engagement with the member to be driven but is mechanically and positively cammed into disengagement at the will and under the full control of the operator. Thus in four-wheel drive vehicles, the wheels or members to be driven are selectively engaged by a drive gear which is slidably advanced through interengagement of cam followers on the drive gear with camming surfaces on the locking gear. In one form, the camming surfaces may be inner and outer concentric cam surfaces which cooperate to simultaneously control the axial displacement of the driving member into engagement with the member to be driven and to positively cam the driving member in a return direction away from engagement with the member to be driven when torque is no longer applied to the driving member and the member to be driven is reversed in rotation.

24 Claims, 11 Drawing Figures

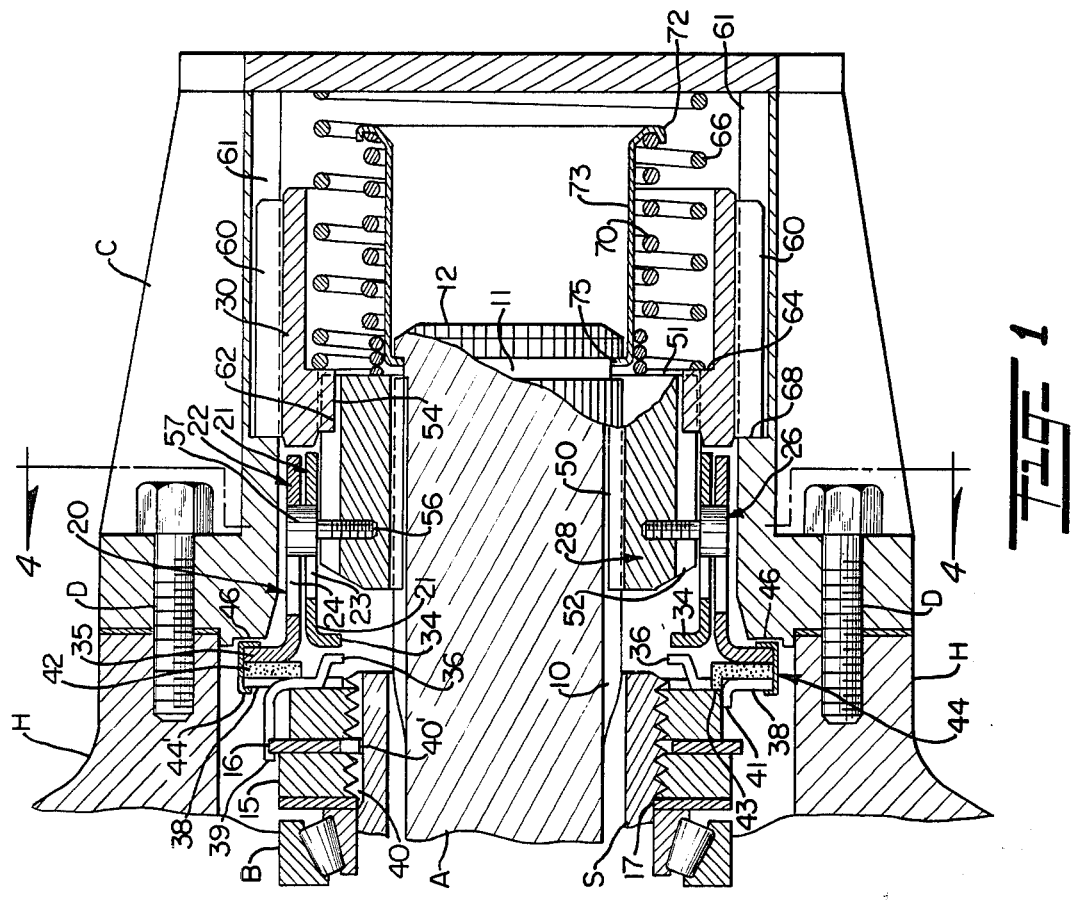
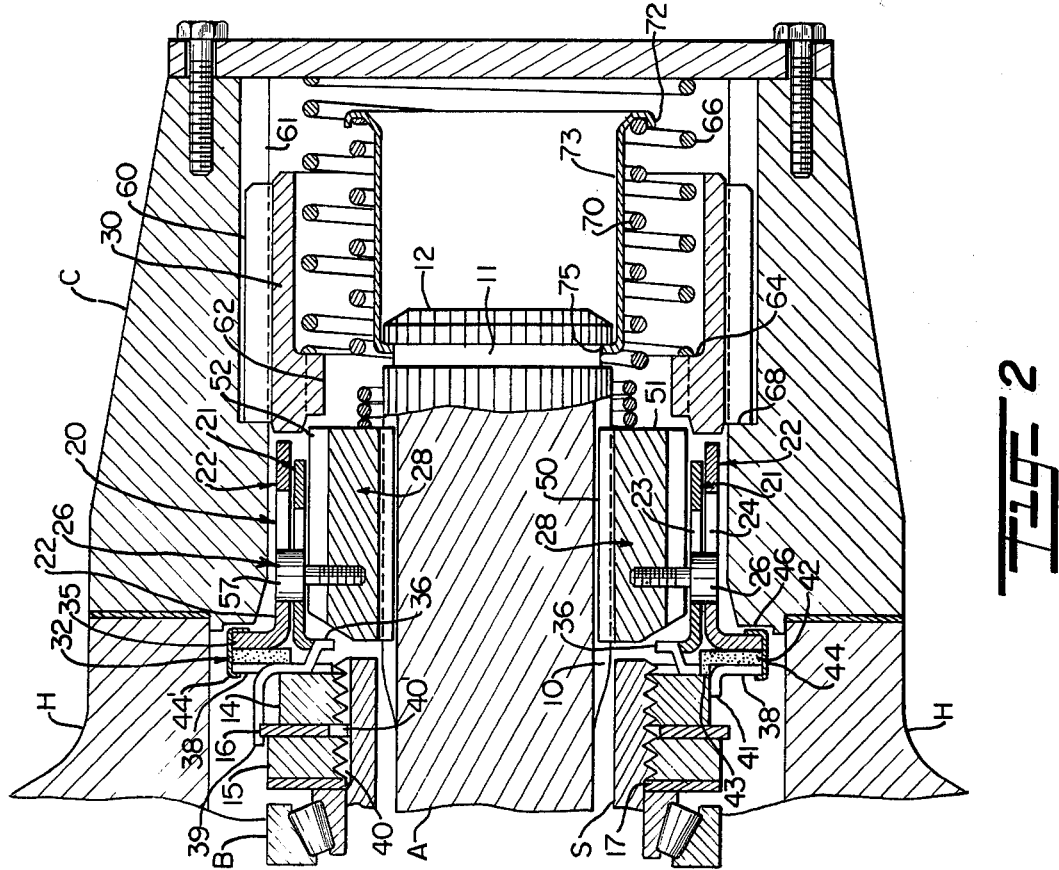

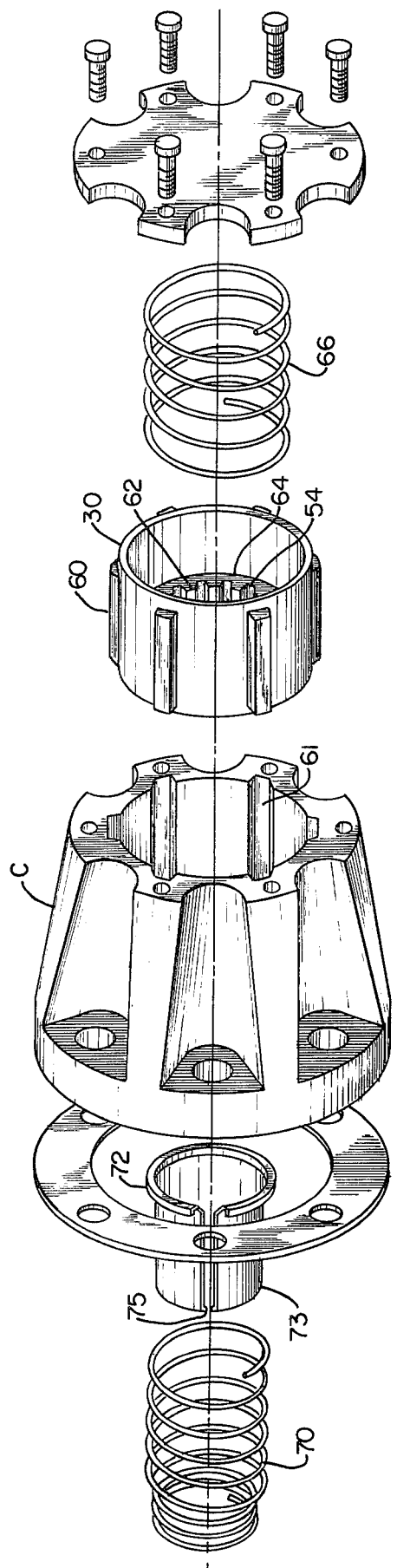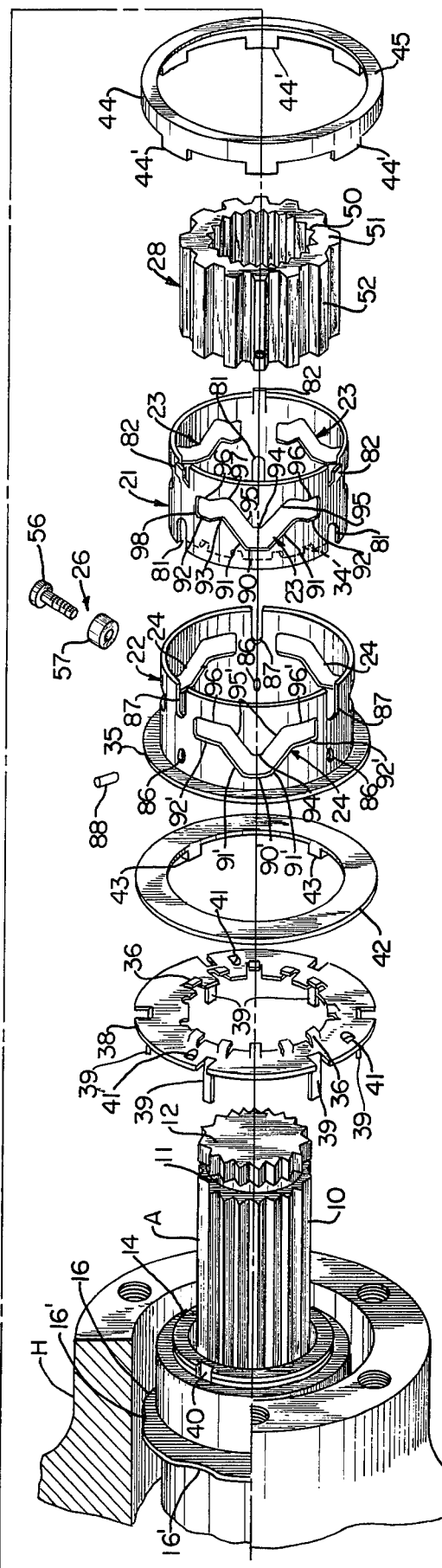
FIG 3

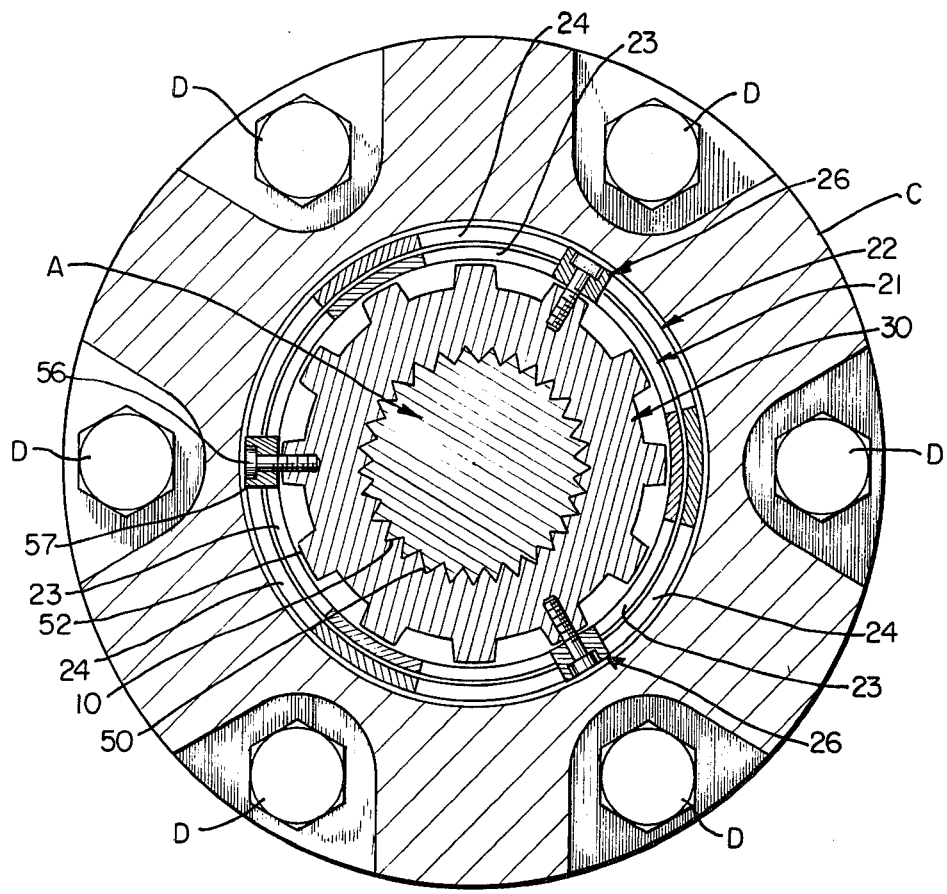
_FIG_ 4
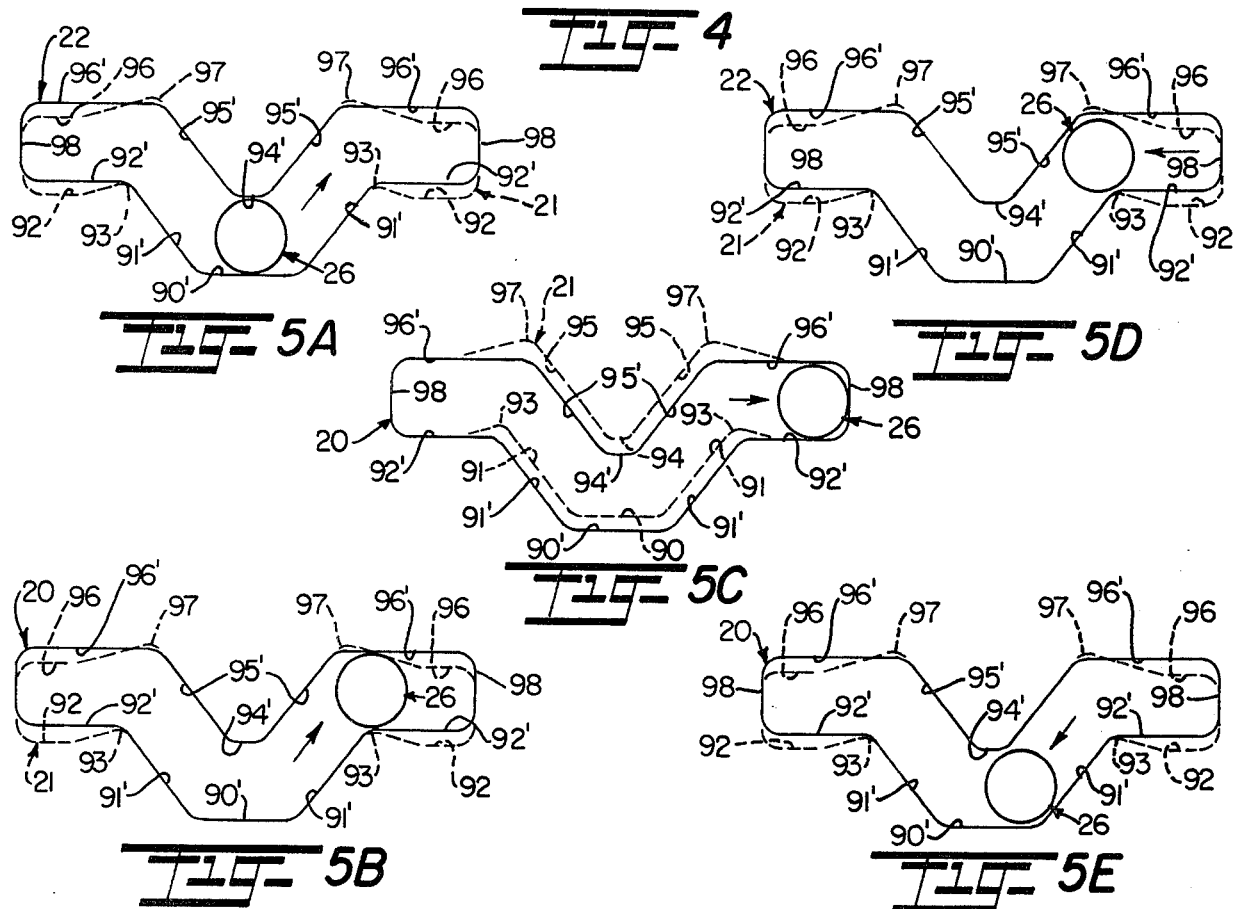
_FIG_ 5A  _FIG_ 5D
_FIG_ 5C
_FIG_ 5B  _FIG_ 5E

AUTOMATIC CLUTCH ASSEMBLY

BACKGROUND OF THE INVENTION

Mechanical clutch assemblies are customarily employed between rotatable drive and driven members to establish selective engagement between the members when torque is applied to the drive member. A typical application is in four-wheel drive controls for vehicles so as to permit selective engagement and disengagement of the drive axle with respect to the front wheels in converting between a two-wheel drive and four-wheel drive. In the past, numerous clutch mechanisms have been devised for this and other applications but have relied to a great extent upon a biasing spring force to slidably disengage two intermeshed gears while sliding one of the gears along a drive shaft. The adhesion of the interfaced gears and of the sliding gear to the drive shaft which is caused by parasitic or latent torque, surface conditions of the intermeshed parts, lubrication or the lack of same, temperature, dirt, clearances, grease viscosity, parts concentricity, burrs, contamination and other conditions have under certain conditions interfered with the disengagement of the teeth between the intermeshed gears so as to result in serious malfunctioning. In any event, clutch mechanisms which rely upon a spring or springs to cause quick disengagement between intermeshing gears are functionally limited by the environmental conditions within the mechanism. Moreover, the return springs in order to possess sufficient force to cause disengagement often impose thrust loads upon the axial thrust bearings of the vehicle as well as bearings supporting the actuating members so that allowable return spring pressures are limited by the construction and parts presently employed in vehicular wheel designs.

One principal problem affecting proper functioning of a clutch mechanism of the type described is that of lubricant conditions and specifications. Extreme hot or cold temperatures will cause standard lubricants to congeal or nearly solidify. Moreover, once a vehicle is in the hands of an owner there is no assurance that the proper lubricants will be employed. Another problem occurs when the vehicle wheels are turned before or during the attempt to disengage the clutch mechanism to impart a substantial cocking pressure to the interfaced gears and the interface between the axle spline and gear thereby requiring increased force to disengage the parts.

Another requirement for four wheel drive vehicles is for all four wheels to remain engaged with the power train even during a steep or sudden descent. It is therefore desirable to provide a clutch mechanism which is capable of positive engagement and disengagement under the control of the vehicle operator without being affected by the aforestated and other known environmental or operating conditions and further will not impose unduly heavy loads on any of the thrust bearings employed within the clutch mechanism or vehicle.

Representative patents which disclose clutch mechanisms for four wheel drives are my U.S. Pat. No. 3,217,845; 3,442,361 to Hegar; and 3,656,598 to Goble. Examples of ball and cam arrangements employed in a clutch mechanism to obtain axial movement in response to the application of torque is shown in U.S. Pat. No. 3,829,147.

SUMMARY OF THE INVENTION

It is therefore an object of the present invention to provide for a novel and improved mechanical clutch which is highly reliable and dependable in operation; and wherein drive and driven members are capable of being positively cammed into and out of engagement under the full control of an operator.

Another object of the present invention is to provide for a novel and improved automatic clutch assembly made up of a minimum number of parts which are movable over a predetermined distance to effect positive engagement and disengagement between drive and driven members.

A further object of the present invention is to provide in an automatic mechanical clutch mechanism for positive engagement and disengagement between the clutch members while avoiding complete dependence upon a return spring or other less positive forms of pressure for disengaging the clutch members.

An additional object of the present invention is to provide in an automatic clutch assembly for a single element capable of effecting all of the necessary movements between the actuating members to bring about engagement or disengagement between the principal drive and driven members.

It is still a further object of the present invention to provide in a four-wheel drive vehicle for an automatic clutch assembly which permits remote but positive control over the clutch assembly to shift the vehicle into four-wheel drive by application of torque to the drive axle or out of four-wheel drive by removal of torque and reverse rotation or turning of the driven member through less than a complete revolution and wherein the clutch assembly is capable of automatically engaging or disengaging either in the forward or reverse direction of the motor vehicle.

Another object of this invention is to prevent damage to the actuating parts and gears as well as the vehicle drive train components when abnormal or abusive sudden torque is applied in the course of engagement or disengagement of the driven and receiving gears; and further to limit axle drift during vehicle operation in four-wheel drives and to more positively relocate the drive axle while shifting into four-wheel drive should the axle have incurred any minor drift when disengaged.

In accordance with the present invention, a locking gear or cam causes a drive member to engage a driven member in response to the application of torque or positive rotation to the drive member. When torque is removed, the drive member can be disengaged only by reversing the direction of rotation of the drive member whereupon the locking gear will positively cam or return the drive member to its disengaged position without relying upon spring force. Specifically, the positive selective engagement and release as described is accomplished through the cooperation of the locking gear with a cam follower or followers on the drive member, each follower protruding through a pair of cooperating slots in inner and outer concentric ring-like cam members which define the locking gear. Each slot is provided with a cam surface configured such that rotation of the drive member will cause each follower or drive pin to advance in an outward axial direction along that cam surface thereby imparting axial movement to the drive member so as to cause it to move into engagement with the member to be driven; and a second cam surface in each slot is so configured and positioned that it will be engaged by the follower to force its associated cam ring away from its normally locked position with a fixed member. A third cam surface is located preferably in the same slot as the second cam surface and is raised along with the second cam surface above the level of the first cam surface to normally retain the follower in a raised position within the first slot irrespective of whether torque is applied to the driving member. Accordingly, it is necessary to reverse the rotation of the driven member to impart a reverse movement to the follower causing it to engage the third cam surface and to drive it in a direction to effect re-engagement of the associated cam ring with the fixed member before the follower is free to return to its original position and the entire drive member is free to slide axially away from the driven member. Accordingly, cooperating cam surfaces simultaneously control the axial displacement of the follower and associated drive member into and out of engagement with a member to be driven. The apparatus described has particular application to four-wheel drive vehicles in which the drive member is splined to a drive axle and is operative to engage a driven member associated with the wheel hub in response to torque applied to the drive axle. The wheel hub is engaged by the drive member so long as rotation continues in a given direction and notwithstanding resistance torque from the driving member and drive train. The drive member also continues to engage the driven member after torque is removed from the driving member and regardless of drive train resistance so long as the driven member overrides and drives the former driving member in the same rotational direction that preceded removal of driving torque from the driving member.

BRIEF DESCRIPTION OF THE DRAWINGS

Other objects, advantages and features of the present invention will become more readily appreciated and understood when taken together with the following detailed description in conjunction with the accompanying drawings, in which:

FIG. 1 is a cross-sectional view of a preferred form of automatic clutch assembly when associated with a four-wheel drive vehicle in accordance with the present invention and showing the assembly in the engaged or four-wheel drive position.

FIG. 2 is a cross-sectional view of the preferred form of present invention with the assembly illustrated in the disengaged position.

FIG. 3 is an exploded view of the automatic clutch assembly as shown in FIGS. 1 and 2.

FIG. 4 is a cross-sectional view taken about lines 4—4 of FIG. 1; and

FIGS. 5A through 5E are enlarged views illustrating the cooperative movement between the camming elements in the preferred embodiment of the present invention.

DETAILED DESCRIPTION OF THE PREFERRED EMBODIMENT

Figure 6A:
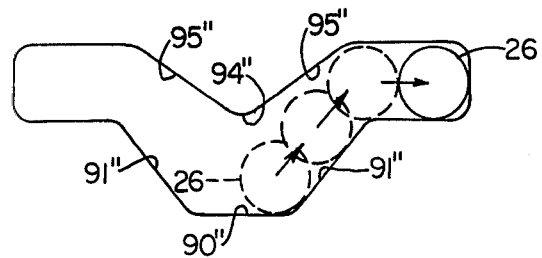
FIGS. 6A and 6B are enlarged views illustrating cooperative movement between cam elements for an alternate form of cam slot configuration, in accordance with the present invention.

Referring in more detail to the drawings, the preferred form of automatic clutch assembly is shown by way of illustrative example for use in connection with a four-wheel drive vehicle and specifically to control the locking and release between a drive axle A and spaced outer concentric wheel hub H. One end of the drive axle A is illustrated in FIGS. 1 and 2 and is provided with external, axially directed splines 10, and an annular groove 11 is formed in the external surface of the outer end of the axle between the splined portions 10 and outer extremity 12 of the axle. A hollow cylindrical spindle S is fixed in spaced outer concentric relation to the drive axle, the external surface of the spindle being threaded to receive an outboard spindle nut 14, and an inboard spindle lock nut 15 is spaced from the nut 14 by a lock washer 16 which is keyed and engaged into keyway 40. Nut 15 is spaced from the inner race of a wheel bearing represented at B by a spacer washer 17. The wheel hub H is journaled for rotation with respect to the spindle S and axle A by the wheel bearing assembly B, and an outer cover flange C is secured to the end of the wheel hub by a series of circumferentially spaced bolts D so as to enclose the entire axle and cam lock assembly. The foregoing description of the wheel assembly is intended to provide a setting for the present invention and specifically for the purpose of describing the unique manner in which a cam lock assembly is interposed between the fixed spindle S, axle A and outer concentric wheel hub H.

The cam lock assembly is generally designated at 20 and in the preferred form is broadly comprised of an inner concentric cam lock or ring member 21 and an outer concentric ring or camming member 22. Members 21 and 22 have aligned cam slots 23 and 24, respectively, at spaced circumferential intervals which are adapted to receive cam follower members 26 projecting outwardly from a drive gear 28. The drive gear 28 defines a first actuating member which is axially advanced in response to rotation of the drive axle A and movement of the cam followers 26 through the cam slots 23 and 24 in a manner to be described. Axial advancement of the drive gear 28 in a direction toward the outer extremity of the axle A will cause it to move into intermeshing engagement with an outer concentric ring gear 30 which in turn interengages with the cover flange C to impart rotation of the drive axle A through the drive gear 28 and ring gear 30 into the cover flange C and attached wheel hub H to impart rotation to the vehicle wheel, not shown. When the drive axle A is no longer rotated or driven, the cam lock assembly 20 functions to positively retract or withdraw the drive gear 28 away from driving engagement with the ring gear, for example, as illustrated in FIG. 2. For this purpose, the inner cam lock 21 is provided with radially inwardly bent teeth or tab extensions 34 at its inboard extremity, and the outer cam 22 is provided with a radially outwardly directed flange or lip 35 at its inboard extremity, the teeth 34 and flange 35 being associated with a spindle lock 38 and thrust washer bearing 42 in a manner now to be described.

The spindle lock 38 is comprised of a series of axially directed and radially inwardly projecting tab extensions 36 which interengage with the inwardly directed teeth 34 on the cam lock 21 to lock the cam lock assembly 20 against rotation when the assembly 20 is in the disengaged position. A series of axially or inwardly directed spring tabs 39 are spaced circumferentially toward the outward radial extremity of the spindle lock 38 and project into shallow depressions or indents 16' on the external edge surface of the lockwasher 16. A radially inwardly projecting key 40' on the inner edge surface of lock washer 16 engages keyway 40 in spindle S. Another series of inwardly projecting tabs 41 bear against the outer annular face of the spindle nut 14 so as to properly center the spindle lock 38 with respect to the nut 14. A thrust bearing 42 is positioned on the outer face of the spindle lock 38 and is preferably an oil-/graphite impregnated bronze bearing which has a series of lugs 43 on its inboard surface to engage slots 41' found by punching out the tabs 41 in the lock washer 38 so as to fix the bearing against rotation while centering the bearing on the spindle lock. The outboard surface of the thrust bearing 42 forms a flat running surface for the flange 35 of the outer cam member 22.

An assembly cup 44 is disposed in surrounding relation to the spindle lock 38, thrust bearing 42 and flange 35 for the purpose of unitising those parts into one assembly and to retain the parts in proper concentric relation to the spindle nut 14 and in outer spaced concentric relation to the drive axle A. The assembly cup 44 is provided with a plurality of tabs 44' at its inboard end which are bent inwardly against the inboard surface or underside of the spindle lock 38 with suitable clearance provided during assembly so as to avoid compressing the parts together and to assure that the outer cam member 22 is free to rotate while the thrust bearing 42 and spindle lock 38 remain stationary.

The drive gear 28 is of hollow cylindrical configuration and relatively thickwalled. Its inner wall surface is splined as at 50 to intermesh with the external spline portions 10 on the axle A. In turn its external surface is splined as at 52 to intermeshingly engage with internal teeth or spline portions 54 on the ring gear 30. The axial movement of the drive gear 28 is controlled by the cam followers 26, each cam follower 26 having a pin 56 provided with a serrated tip which is driven radially in press-fit engagement into an opening in the body of the drive gear 28 and an outer roller 57 journaled on the pin and adapted to project radially outwardly from the pin for engagement within the aligned cam slots 23 and 24 of the cam lock assembly 20.

The ring gear 30 is operative to impart the rotational driving force of the axle A into the outer hub when the drive gear 28 is advanced into engagement with the ring gear; and to this end, the ring gear has external splined portions 60 extending axially along its external surface and interengaging with internal splined portions 61 on the inner wall of the cover flange C. The internal splined portions 54 which are selectively engaged by the drive gear extend along an inwardly stepped, internal wall 62 at the inboard or lower end of the ring gear 30. In turn, a shoulder or stepped portion 64 is formed at the outer end of the internal splines 54 to provide a seating surface for one end of a coiled spring 66 which extends between the outer end wall of the cover flange C and the seating surface 64 to urge the ring gear 30 to an inboard position with the external splined portion 60 bearing against a shoulder 68 at the end of the splined portion 61 on the cover flange. Another compression spring 70 is positioned in inner spaced concentric relation to the spring 66 and has one end bearing against the end of the drive gear 28 and its opposite or outer end is seated within a return flanged portion 72 on the outer end of a spring retainer 73 which forms an outward axial extension of the splined end portion of the axle A. As illustrated the inner end of spring retainer 73 has a radially inwardly bent flange or tab 75 which is inserted into the annular groove 11 at the outer end of the axle. In this relation, it is emphasized that the spring members 66 and 70 function primarily to maintain proper spacing between the ring gear and drive gear as well as to minimize any rattling or shifting of the parts during operation of the vehicle. Thus, other suitable means of alignment could be employed for this purpose, such as, magnets since the spring elements described are not required to effect engagement or disengagement between the clutch and cam members.

An important feature of the present invention resides in the cooperative disposition and relation between the inner and outer cam elements 21 and 22 and the manner in which they cause the drive gear 28 to be forcibly cammed into engagement with the ring gear 30; and further the manner in which they cause the drive gear to be positively cammed or drawn away from engagement with the ring gear under the full control of the vehicle operator and without relying upon the force of the springs 66 and 70. Specifically referring to FIG. 3, it will be noted that the inner cam member 21 is in the form of a hollow cylindrical, thin-walled sleeve or ring member having a series of three generally V-shaped winged cams 23 formed at equal 120° intervals in the intermediate wall thickness of the body of the cam 21. A plurality of downwardly directed open slots 81 are disposed intermediately between the cams 23, and radially outwardly bent tabs 82 are formed out of the wall of the cam adjacent to its upper or outboard edge intermediately between the cam slots 23. The inwardly directed teeth 34 as previously stated extend inwardly in a radial direction from the lower or inboard edge of the cam and are adapted to effect engagement with the upwardly bent tab extensions 36 of the spindle lock 38. The outer concentric cam lock member 22 is similarly in the form of a hollow cylindrical, thin-walled sleeve having a series of three generally V-shaped winged slots 24 at equally spaced circumferential intervals, or 120° apart, and are formed through the intermediate wall thickness of the body of the cam 22. Apertures 86 are formed in the member 22 intermediately between the cam slots 24 adjacent to the outboard face of flange 35, and upwardly directed open slots 87 are formed intermediately between the cam slots 24. In assembled relation when the inner cam 21 is placed within the outer cam 22, the outwardly projecting tabs 82 are aligned within the slots 87 so as to initially fix the inner cam 21 against rotation with respect to the outer cam 22 and in which relation the lower open slots 81 are aligned with the apertures 86 to receive a connecting pin 88 through each of the respective aligned apertures 86 and slots 81 so as to assist in locking the inner cam 21 against rotation with respect to the outer cam 22 while permitting a limited degree of independent axial movement of the inner cam in a manner to be hereinafter described. Once the cam members 21 and 22 are aligned, each of the three inner cam slots 23 are aligned opposite to a respective outer cam slot 24 so as to permit insertion of a cam follower assembly 26.

Considering in somewhat more detail the configuration of the inner and outer cam slots 23 and 24, respectively, it will be noted that the inner cam slot 23 is provided with a bottom or inboard horizontal bearing surface 90, inclined bearing surfaces 91 diverging at substantially a 45° angle away from the surface 90 and intersecting a downwardly inclined bearing surface 92 at a point 93, the downwardly inclined bearing surface 92 inclining at an angle of approximately 20° to horizontal away from the point 93. An upper or outboard horizontal bearing surface 94 is aligned opposite to the bearing surface 90 but is of considerably less length than the bearing surface 90; and upper inclined bearing surfaces 95 diverge away from the bearing surface 94 to intersect downwardly inclined bearing surfaces 96 at a point or line 97, the surfaces 96 being spaced above the surfaces 92. Vertical surfaces 98 extend between the outer lateral edges of the downwardly inclined surfaces 92 and 96 so as to close opposite lateral edges of the cam slot. The aligned bearing surfaces on the cam slot 24 generally corresponding to those of cam slot 23 are enumerated with like prime numerals. Specifically, the upper and lower bearing surfaces 94' and 90' together with the inclined surfaces 95' and 91' are of corresponding construction and related configuration to those of the bearing surfaces 94, 90, 95 and 91 in the inner cam 21. However the upper and lower bearing surfaces 96' and 92' extend in a horizontal direction away from their intersection with the inclined bearing surfaces 91' and 95', as opposed to the downwardly directed or sloped disposition of the surfaces 92 and 96 in the inner cam member.

The interrelationship between the cam members 21 and 22 and cam follower 26 can best be appreciated from a consideration of the sequential movement between the slots and the cam follower in response to the application or removal of torque on the drive axle A. As shown in FIG. 5A, when the vehicle is in two-wheel drive and no torque is applied to the drive axle, the cam follower 26 will normally be positioned at the bottom of the slots 23 and 24 between the pairs of bearing surfaces 90, 90' and 94, 94'. However, when torque is applied to the drive axle, it will cause the drive gear 28 to rotate with the drive axle A in response to which the cam follower 26 will according to the direction of rotation of the drive axle advance upwardly along one of the inclined surfaces 91' of the outer cam lock member 22. In its continued advancement along the horizontal bearing surface 92' of the outer cam 22 however it will simultaneously engage the upper inclined bearing surface 96 of the inner cam 21 causing the inner cam to be lifted away from engagement with the spindle lock 38, the movement of the inner cam 21 and follower 26 being illustrated in FIGS. 5B and 5C. In response to upward or outward movement of the cam follower 26 along the inclined bearing surfaces 91 and 91', the drive gear 28 will have been axially advanced into engagement with the ring gear 30. FIG. 5C illustrates the interrelationship between the cam follower 26 and the cam slots 23 and 24 when the follower has been driven to one end of the slots, at which point the inner cam 21 has been fully disengaged from the spindle lock 38. As long as torque is applied to the drive axle A the cam follower 26 will remain in this position; and further irrespective of whether torque is applied to the drive axle, the cam follower will remain in the position shown in FIG. 5C until the drive axle is reversed in its direction of rotation. Thus it is necessary to bring the vehicle to a complete stop and to reverse the rotation of the drive axle in order to initiate disengagement of the drive gear 28 from the ring gear 30.

FIG. 5D illustrates initial return movement of the cam follower 26 in causing the drive gear to be axially retracted away from the ring gear and in returning the inner cam lock member 21 into engagement with the spindle lock 38. FIG. 5E illustrates the relative position of the cam slots 23 and 24 and cam follower 26, specifically in returning the bearing surfaces 95 and 96 to their original position, with bearing surfaces 96 and 92 slightly offset beneath the bearing surfaces 96' and 92' of the outer cam member 22. Again in disengaging the clutch or returning to a two-wheel drive position, the inner cam 21 will re-engage the extension tabs 39 on the spindle lock 38, enabling the drive gear 28 to be retracted away from the ring gear and returned to its original position as shown in FIG. 2. When the cam follower is retracting gear 28 from gear 30 while progressing along cam face 95' of outer cam 22, the total actuator assembly 20 is prevented from moving outwardly by the abutment of face 45 of assembly cup 44 against the face 46 of the cover flange C. In returning the vehicle to the two-wheel drive position, it is only necessary to rotate the drive axle in reverse over a very limited interval necessary for the drive gear to become disengaged from the ring gear 30. The return springs 66 and 70 will assist somewhat in driving the cam follower 26 to its lowermost position between the intermediate bearing surfaces 90' and 94'; also, they will urge each cam follower 26 away from an upper bearing surface 95' and against the lower bearing surface 91' causing the cam member to be forced to the right, until the cam follower has been seated once again on the lower bearing surface 90'.

The difference in the tooth width of teeth 34 of cam lock 21 and the space between the tabs 36 of spindle lock 38 is intentionally constructed to provide a backlash greater than required to reversely rotate the cams 21 and 22 allowing cam follower 26 to seek and abut cam face 90' after gears 30 and 28 have separated and axle A is no longer driven in a reversed direction.

In further explanation referring to FIG. 5D, as cam follower strikes the inclined cam face 95' the teeth 34 which have engaged the tabs 36 are applying force in a leftward direction as viewed in FIG. 5D. When gears 30 and 28 separate, cam follower 26 is nearing the inboard end of slope cam face 95'. At the moment of disengagement spring 70 urges drive gear 28 inwardly and cam followers 26 inwardly whereby cam followers 26 drop from inclined face 95' to near the bottom of inclined face 91'. Because of the predescribed backlash between teeth 34 and tabs 36 the cams 21 and 22 can now rotate to the right allowing cam follower 26 to drop to cam face 90' without rotation of drive gear 28 and axle A.

In actual practice, when the vehicle is in two-wheel drive, the cam follower 26 is normally located on the lower bearing surface as described. Four-wheel drive vehicles typically have a shift lever into a transfer case which enables the operator to apply engine power and torque to the front end mechanism of the vehicle or to disengage power from the front end drive mechanism. Thus when the vehicle is in a two-wheel drive position, the cam members 21 and 22 are keyed to one another as described with the inner cam member 21 capable of limited slidable movement axially with respect to the outer cam 22 but neither can rotate independently of the other. Of course as long as the inner cam 21 is locked to the spindle lock 38, neither of the cam members is capable of rotating until the inner cam 21 is released from engagement with the spindle lock. When the vehicle is shifted to four-wheel drive, for example, by shifting the transfer case lever to apply torque and power to the drive axle A, the drive gear will rotate along with the drive axle. Rotation of the drive gear will force the cam followers 26 along the inclined bearing surfaces of the cooperating cam slots until the drive gear has been driven axially to a position of full engagement with the ring gear 30. In the event that the teeth of the drive gear 28 do not immediately engage the inner splined teeth of the ring gear 30, the ring gear 30 is capable of sliding outwardly against the return spring 66 but will snap back into engagement with the drive gear 28 once the teeth are properly aligned. Continued rotation forces the inner cam member 21 outwardly away from engagement with the spindle lock 38 so that the inner and outer cam members 21 and 22 are then free to rotate with the drive gear as the drive gear imparts the rotational force of the drive axle through the ring gear and cover flange into the wheel hub and wheel. In the course of engagement between the drive gear and ring gear, the inner spring 70 is compressed against the end of the spring retainer 73 and therefore will continue to exert a force on the drive gear. When compressed, the smaller diameter inboard coils of the spring 70 will encircle and encapsulate the inboard section of the spring retainer 73 so as to limit the diametric expansion of the retainer causing the flange 75 to remain engaged into groove 11 of axle A when thrust loads are placed on the inboard face of the retainer. When the drive gear 28 has been driven to its outboard axial location, the outboard face 51 of drive gear 28 is located in predetermined spaced relationship to flange 75 of retainer 73 and groove 11 of axle A and drive gear 28 now provides a positive stop to prevent the drive axle from being drawn inwardly when the wheels are turned in either direction while in four-wheel drive.

In order to disengage the clutch assembly, as stated, the vehicle driver must first shift the vehicle drive transfer case to the two-wheel drive position in order to disconnect the power train and power from the axle A; and secondly the vehicle must be reversed in direction so that the vehicle hub H will drive the cover flange C and ring gear 30 in a reverse direction. Thus the ring gear in effect becomes the driving gear to impart reverse rotation to the drive gear 28 and cam follower 26. It will be noted that in the process of disengagement as described, the inner splined portion of the ring gear 30 engages only a limited section of the externally splined teeth of the drive gear 28. As the cam followers 26 are forcibly disengaging the drive gear from the ring gear, the frictional adhesion of the splines between the drive and ring gears will decrease proportionally as the drive gear slides away from engagement with the ring gear and toward complete disengagement. At the moment of disengagement the compression of the spring 70 in applying pressure against the drive gear 28, will cause the cam followers 26 to move against the lower bearing surfaces 90 and 90' of each of the cam slots while urging the drive gear completely away from the ring gear.

In the preferred form and for the purpose of illustration, the cam members 21 and 22 are illustrated as having a series of three slots which operate in combination with three cam followers 26 on the drive gear. It will be evident however that the specific construction and relationship between the cam slots and cam followers may be varied depending upon the intended application of the clutch assembly and the size of the other parts. Moreover it will be apparent that the interrelationship between the cam slots and cam followers may be varied where for example a single cam member would be employed in cooperation with two or more cam followers. For instance, one of the cam followers would advance along a cam slot in the cam corresponding to one of the slots in the outer cam member and another of the cam followers would work in cooperation with a slot corresponding to that of the inner cam ring. Additionally the concentric relationship between the driving cam and the camlock can be changed wherein the inner cam becomes the outer cam and vice versa by relocating the spindlelock tabs radially outward and moving the thrust bearing radially inward.

Figure 6B:
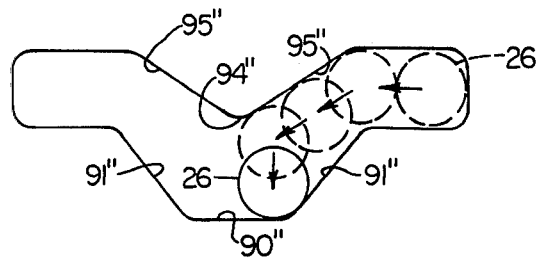

Another example of an alternate form of cam slot configuration is shown in FIGS. 6A and 6B wherein the vertical distance between slope cam faces 91" and 95" is greater inboard than outboard at the cam wings 92" and 96" so as to effect a straight axial movement of cam follower 26 from cam face 95" directly to cam face 90" without further driven reverse rotation of drive gear 28 at the moment of disengagement of gear 28 from gear 30. Stated another way, outboard face 95" has a gentler slope than in the preferred form to diverge away from inboard slope 91" to position 90" under the point of disengagement of the follower 26 from face 95".

Although the present invention has been described with particularity relative to the foregoing detailed description of the preferred embodiment, various modifications, changes, additions and applications other than those specifically mentioned herein will be readily apparent to those having normal skill in the art without departing from the spirit and scope of the present invention.

I claim:

1. In a clutch assembly, an actuator mechanism operative to effect releasable but positive driving engagement between a member to be rotated and a rotatable drive member, said actuator mechanism comprising:
    first actuating means including a cam follower rotatable in response to positive rotation of said drive member;
    second actuating means releasably locked against rotation and provided with first cam control means operative to advance said first actuating means into engagement with the member to be driven, second cam control means engageable by said first actuating means to release said second actuating means for rotation upon engagement between said first actuating means and the member to be driven, and third cam control means engageable by said first actuating means when said drive member is no longer positively rotated and the member to be driven is reversed in its direction of rotation with respect to said drive member whereby to return said second actuating means to its locked position and to disengage said first actuating means from driving engagement with the member to be driven.

2. In a clutch assembly according to claim 1, said cam follower including at least one radially outwardly projecting drive lug engageable with said first, second and third cam control means in succession as it urges said first actuating means into engagement with said member to be driven.

3. In a clutch assembly according to claim 1, said second actuating means being in the form of a ring-like member disposed in outer concentric relation to said first actuating means.

4. In a clutch assembly according to claim 3, said ring-like member defined by a pair of inner and outer concentric rings provided with cooperating slots therein which define said cam control means, said first cam control means defined by bearing surface portions in one of said cooperating slots, and said second and third cam control means defined by bearing surface in the other of said cooperating slots.

5. In a clutch assembly according to claim 4, said inner concentric ring being releasably locked against rotation and said outer concentric ring being axially slidable with respect to said inner concentric ring while being locked for rotation with said inner concentric ring.

6. In a clutch assembly according to claim 1, biasing means operative to urge said first actuating means in a direction normally engageable with said third cam control means.

7. In a clutch assembly, an actuator mechanism operative to effect releasable but positive driving engagement between a first member to be rotated and a second rotatable drive member, said actuator mechanism comprising:
a first cam member rotatable in response to rotation of said drive member and a second cam member normally locked against rotation, one of said first and second cam members defined by at least one pin member and the other of said cam members provided with pin-engaging slotted means defining a series of bearing surfaces cooperating with said pin member so that relative rotation between said first and second cam members in one direction causes axial sliding movement of said rotatable drive member into engagement with said first member, and rotation of said drive member in an opposite direction causes movement of said drive member out of engagement with said first member.

8. In a clutch assembly according to claim 7, said other of said cam members defined by a pair of inner and outer concentric sleeves provided with said pin-engaging slotted means therein, said sleeves being locked for rotation with one another while being free to undergo limited independent axial movement with respect to one another.

9. In a clutch assembly according to claim 7, said pin-engaging slotted means including an inclined bearing surface portion facing in the direction of the member to be rotated, and a second inclined bearing surface facing in a direction away from said first member to be rotated.

10. A clutch assembly adapted to selectively and automatically engage and disengage an outer hub and wheel member in a four-wheel drive vehicle with respect to an inner concentric drive axle, said inner concentric drive axle mounted for rotation within a stationary axle housing and having a splined end portion projecting outwardly from one end of said drive axle, said clutch assembly comprising:
an actuator mechanism interposed between the splined end portion of said drive axle and said outer hub, said actuator mechanism including an annular drive gear keyed for rotation on said splined end portion and having at least one radially outwardly projecting drive lug thereon and a series of axially extending, circumferentially spaced tooth members on its external surface;
a driven gear connected to said outer hub for rotation therewith and having a series of internally projecting teeth arranged at spaced circumferential intervals and adapted to intermesh with said external teeth on said drive gear; and
inner and outer concentric cam ring members disposed in outer concentric relation to said drive gear, said cam ring members each provided with first, second and third bearing surfaces engageable with said drive lug, one of said inner and outer cam ring members being releasably locked against rotation to said axle housing, and the other of said cam ring members being fixed against axial displacement, said first bearing surface engageable with said drive lug to advance said drive gear axially into intermeshing engagement with said driven gear in response to positive rotation of said drive axle, said second bearing surface engageable with said drive lug upon movement of said drive gear into intermeshing engagement with said driven gear to axially advance said one cam ring member away from locked engagement with said axle housing, and a third bearing surface engageable with said drive lug in response to the removal of positive rotation of said drive axle and the reversal of rotation of said outer hub with respect to said drive axle whereby to axially retract said drive gear away from intermeshing engagement with said driven gear and to retract said one cam ring member to its normally locked position with said axle housing.

11. A clutch assembly according to claim 10, said first bearing surface disposed on said other cam ring member and inclining in a direction at an acute angle with respect to the direction of rotation of said other cam ring member, said second bearing surface disposed on said one cam ring member and facing in a generally opposite direction to that of said first bearing surface, and said third bearing surface disposed on said other cam ring to incline in a direction substantially parallel to said first bearing surface and being disposed in opposed facing relation to said first bearing surface.

12. A clutch assembly according to claims 10 or 11, there being a plurality of said drive lugs in circumferentially spaced relation to one another engageable with a plurality of said first, second and third bearing surfaces in urging said drive gear into and out of engagement with said driven gear.

13. A clutch assembly according to claim 10, said first, second and third bearing surfaces forming the walls of substantially aligned slots in said inner and outer concentric cam ring members.

14. A clutch assembly according to claim 13, one of said slots provided with said first and third bearing surfaces and the other of said slots provided with said second bearing surface.

15. A clutch assembly according to claim 14, there being a pair of first bearing surfaces sloping at equal angles but in opposite directions away from a common surface portion therebetween, and a pair of third bearing surfaces sloping at equal angles but in opposite directions away from a common surface portion therebetween.

16. A clutch assembly according to claim 14, said pairs of first and third bearing surfaces defining the walls of a generally V-shaped slot having opposite lateral extensions at opposite free ends of said slot.

17. A clutch assembly according to claim 16, there being a pair of second bearing surfaces sloping at reverse angles to said first and third bearing surfaces, said second bearing surfaces being circumferentially aligned with said lateral extensions of said V-shaped slot.

18. A clutch assembly according to claim 10, said axle housing concentrically disposed between said drive axle and said wheel hub, a lock assembly at one end of said axle housing adjacent to said cam ring members, said one cam ring member including circumferentially extending flange members engaged by said lock assembly to prevent axial displacement of said one cam ring member with respect to said axle housing.

19. A clutch assembly according to claim 18, said lock assembly having a circumferentially extending bearing surface abutting said flange on said one cam ring member to permit rotation of said flange with respect to said axle housing.

20. A clutch assembly according to claim 18, said lock assembly and said other cam ring member having interengaging locking elements to fix said other cam ring member against rotation while permitting axial displacement of said other cam ring member with respect to said lock assembly.

21. A clutch assembly according to claim 20, said cam ring members being locked for rotation together and the other cam ring member but movable axially with respect to said one cam ring member.

22. An actuator mechanism adapted to establish releasable driving engagement between a member to be rotated and a rotatable drive member comprising:
- a drive gear rotatable in response to positive rotation of said drive member;
- a releasable cam lock assembly in outer concentric relation to said drive gear and provided with a first cam surface operative to advance said drive gear axially into engagement with the member to be rotated, a second cam surface engageable by said drive gear to release said releasable cam lock assembly for rotation upon engagement between said drive gear and the member to be rotated, and a third cam surface engageable by said drive gear when said drive member is no longer positively rotated and the member to be driven is reversed in direction of rotation with respect to said drive member whereby to return said releasable cam lock assembly to its locked position and to disengage said drive gear from driving engagement with the member to be rotated.

23. An actuator mechanism according to claim 22, said drive gear having a radially outwardly projecting drive lug engageable with said first, second and third cam surfaces.

24. An actuator mechanism according to claim 22, said cam lock assembly defined by a pair of inner and outer concentric sleeves provided with aligned slots therein, said first cam surface defining an outer surrounding edge portion in one of said slots, and said second and third cam surfaces defining outer surrounding edge portions in the other of said cooperating slots.

* * * * *